(12) United States Patent  
Hamasaki et al.

(10) Patent No.: US 10,329,634 B2
(45) Date of Patent: Jun. 25, 2019

(54) QUENCHING APPARATUS AND METHOD FOR PRODUCING METALLIC MATERIAL

(71) Applicant: NIPPON STEEL & SUMITOMO METAL CORPORATION, Tokyo (JP)

(72) Inventors: Yutaka Hamasaki, Nishinomiya (JP); Hiroshi Hayashi, Amagasaki (JP); Shinji Hosoya, Amagasaki (JP); Shinjirou Kuwayama, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 281 days.

(21) Appl. No.: 15/314,956

(22) PCT Filed: Jun. 1, 2015

(86) PCT No.: PCT/JP2015/002750
§ 371 (c)(1),
(2) Date: Nov. 30, 2016

(87) PCT Pub. No.: WO2015/186337
PCT Pub. Date: Dec. 10, 2015

(65) Prior Publication Data
US 2017/0198367 A1   Jul. 13, 2017

(30) Foreign Application Priority Data

Jun. 5, 2014 (JP) .................. 2014-116965

(51) Int. Cl.
*C21D 9/08* (2006.01)
*B01D 19/02* (2006.01)
(Continued)

(52) U.S. Cl.
CPC ......... *C21D 9/085* (2013.01); *B01D 19/0031* (2013.01); *B01D 19/02* (2013.01);
(Continued)

(58) Field of Classification Search
CPC ................................. C21D 1/667; C21D 1/64
See application file for complete search history.

(56) References Cited

U.S. PATENT DOCUMENTS

| 2,893,409 | A | * | 7/1959 | Wulf | ...................... C21D 1/667 134/122 R |
| 4,052,235 | A | * | 10/1977 | Nakaoka | ................. C21D 9/573 148/623 |
| 2017/0198367 | A1 | * | 7/2017 | Hamasaki | .............. B01D 19/02 |

FOREIGN PATENT DOCUMENTS

WO   2006/093006   9/2006

\* cited by examiner

*Primary Examiner* — Scott R Kastler
(74) *Attorney, Agent, or Firm* — Clark & Brody

(57) ABSTRACT

A circulation apparatus recovers cooling fluid after the cooling fluid is used for quenching and supplies the cooling fluid to a defoaming bath. A laminar flow weir of a defoaming apparatus partitions the defoaming bath into laminar and shallow flow baths. The laminar flow weir is lower than a side wall of the laminar flow bath. Cooling fluid from the circulation apparatus is supplied to the laminar flow bath and the cooling fluid is poured into the shallow bath from the laminar flow bath along the laminar flow weir. A filter covers an opening in a bottom portion of the shallow bath. The liquid level height in the shallow bath is less than the height of the laminar flow weir. A supply bath accumulates cooling fluid that passes through the filter, and supplies the cooling fluid to a cooling apparatus that sprays the cooling fluid onto a metallic material.

8 Claims, 3 Drawing Sheets

(51) Int. Cl.
*C21D 1/18* (2006.01)
*C21D 1/613* (2006.01)
*C21D 1/667* (2006.01)
*B01D 19/00* (2006.01)
*C21D 1/64* (2006.01)
(52) U.S. Cl.
CPC ............... *C21D 1/18* (2013.01); *C21D 1/613* (2013.01); *C21D 1/64* (2013.01); *C21D 1/667* (2013.01)

QUENCHING APPARATUS AND METHOD FOR PRODUCING METALLIC MATERIAL

TECHNICAL FIELD

The present invention relates to a quenching apparatus, and more particularly to a quenching apparatus that performs quenching by spraying a cooling fluid onto a metallic material, a method for producing a metallic material, and a quenching method.

BACKGROUND ART

One type of quenching apparatuses performs quenching by spraying a cooling fluid onto a heated metallic material. For example, three-dimensional hot bending and quench equipment (hereunder, referred to as "3DQ equipment") disclosed in International Application Publication No. WO 2006/093006 (Patent Literature 1) includes a gripping mechanism and a quenching apparatus. The gripping mechanism includes a rotatable and movable gripping portion. The gripping mechanism rotates and moves a heated metallic material while gripping the metallic material with the gripping portion, and applies a bending moment to the metallic material. The quenching apparatus includes a heating apparatus and a cooling apparatus. The heating apparatus heats a portion of the metallic material. The heating apparatus is, for example, a high-frequency heating furnace. The cooling apparatus cools the metallic material by spraying a cooling fluid.

The heated metal portion is subjected to a bending process by the gripping mechanism. The metal portion that is bent by the bending process is quenched by a cooling fluid that is sprayed from the cooling apparatus.

However, in a quenching apparatus of a type that performs quenching by spraying a cooling fluid, even if a sufficient amount of cooling fluid is sprayed, it may be difficult to make the quenching stable. Further, when performing a bending process by means of 3DQ equipment, quenching may be unstable and it may be difficult to obtain stable processing accuracy.

SUMMARY OF INVENTION

An objective of the present invention is to provide a quenching apparatus with which stable quenching is obtained, and a method for producing a metallic material.

A quenching apparatus according to the present embodiment sprays a cooling fluid onto a metallic material to perform quenching. The quenching apparatus includes a defoaming apparatus, a supply bath and a cooling apparatus. The defoaming apparatus removes air bubbles from the cooling fluid. The supply bath accumulates cooling fluid that air bubbles has been removed. The cooling apparatus sprays cooling fluid that has been supplied from the supply bath toward the metallic material. The defoaming apparatus includes a defoaming bath and a circulation apparatus. The circulation apparatus recovers cooling fluid that has been used for quenching and supplies the cooling fluid to the defoaming bath. The defoaming bath includes a laminar flow weir. The laminar flow weir partitions the defoaming bath into a laminar flow bath and a shallow bath, and is lower than a side wall of the laminar flow bath. Cooling fluid is supplied to the laminar flow bath from the circulation apparatus, and cooling fluid that flows over the laminar flow weir by overflowing from the laminar flow bath is poured into the shallow bath. The shallow bath includes a bottom portion that has an opening, and a filter. The filter is formed in a plate shape or a sheet shape, and has a mesh structure. The filter covers the opening in the bottom portion. A liquid level height in the shallow bath is less than a height of the laminar flow weir. The supply bath accumulates cooling fluid that has passed through the filter.

A method for producing a metallic material according to the present embodiment utilizes the above described quenching apparatus. The method for producing a metallic material includes a step of heating a metallic material, and a step of performing quenching of the metallic material by spraying a cooling fluid onto the heated metallic material. The step of performing quenching includes a step of removing air bubbles from the cooling fluid by means of the defoaming apparatus, and a step of spraying the cooling fluid after air bubbles are removed onto the heated metallic material.

According to the quenching apparatus and method for producing a metallic material of the present embodiment, stable hardenability is achieved.

DESCRIPTION OF EMBODIMENTS

Figure 1:
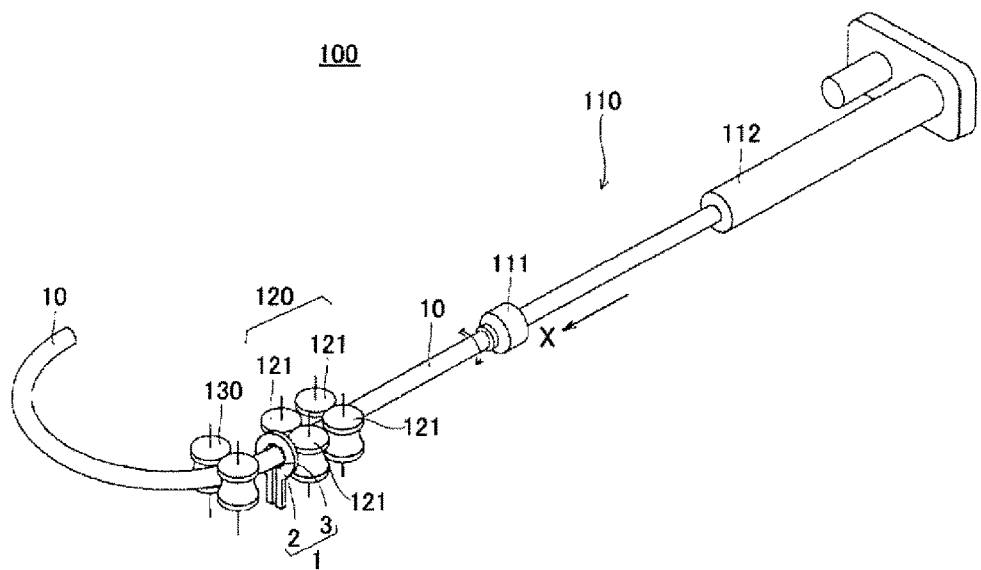
FIG. 1 is a perspective view of a three-dimensional hot bending and quench equipment in which a quenching apparatus of the present embodiment is utilized.

A quenching apparatus according to the present embodiment sprays a cooling fluid at a metallic material to perform quenching. The quenching apparatus includes a defoaming apparatus, a supply bath and a cooling apparatus. The defoaming apparatus removes air bubbles from the cooling fluid. The supply bath accumulates cooling fluid after air bubbles are removed. The cooling apparatus sprays cooling fluid supplied from the supply bath toward the metallic material. The defoaming apparatus includes a defoaming bath and a circulation apparatus. The circulation apparatus recovers cooling fluid after the cooling fluid is used for quenching and supplies the cooling fluid to the defoaming bath. The defoaming bath includes a laminar flow weir. The laminar flow weir partitions the defoaming bath into a laminar flow bath and a shallow bath, and is lower than a side wall of the laminar flow bath. Cooling fluid from the circulation apparatus is supplied to the laminar flow bath, and cooling fluid that flows over the laminar flow weir by overflowing from the laminar flow bath is poured into the shallow bath. The shallow bath includes a bottom portion that has an opening, and a filter. The filter is formed in a plate shape or a sheet shape, and has a mesh structure. The filter covers an opening of the bottom portion. A liquid level height of the shallow bath is less than a height of the laminar flow weir. The supply bath accumulates cooling fluid that passes through the filter.

In a quenching apparatus of a type that quenches by spraying a cooling fluid, the cooling capacity of the cooling fluid decreases if there is a large amount of air bubbles in the cooling fluid. Specifically, the heat transfer efficiency of a gas is lower than the heat transfer efficiency of a liquid. Therefore, if cooling fluid contains a large content of air bubbles, the influence of the air bubbles on the cooling capacity increases and the cooling capacity decreases. In the quenching apparatus according to the present embodiment, air bubbles are removed from the cooling fluid before the cooling fluid is used for quenching. Consequently, the quenching apparatus of the present embodiment can raise the cooling capacity of the cooling fluid and can adequately quench a metallic material. Therefore, the hardenability is stable. When the quenching apparatus of the present embodiment is utilized in 3DQ equipment, quenching of a metallic material portion that is bent by the 3DQ equipment can be stably performed in a substantially uniform manner. Therefore, the accuracy of a processed shape of a metallic material that is processed by the 3DQ equipment is stable.

Further, according to the present embodiment, air bubbles included in cooling fluid that is recovered after the cooling fluid is used for quenching are reduced by the following method. In a quenching apparatus of a type that quenches by spraying a cooling fluid, in order to efficiently quench a metallic material, the cooling fluid is caused to collide with the metallic material so that the cooling surface area increases. In this case, the flow of the cooling fluid fluctuates due to such a collision. In addition, because the cooling fluid scatters in the atmosphere, air bubbles are included in the cooling fluid at that time. Therefore, a large amount of air bubbles are included in the cooling fluid after the cooling fluid has been used for quenching.

In the present embodiment, cooling fluid in which a large amount of air bubbles are included after the cooling fluid is used for quenching is recovered by the circulation apparatus and supplied to the laminar flow bath in the defoaming bath. The flow of the cooling fluid supplied to the laminar flow bath is in a turbulent state. Consequently, a large amount of air bubbles are included in the cooling fluid that is supplied to the laminar flow bath. The laminar flow bath temporarily accumulates the cooling fluid. Air bubbles included in the cooling fluid that is being accumulated naturally rise to the surface and disappear at the liquid surface. The cooling fluid in which air bubbles have been reduced to a certain extent flows over the laminar flow weir that is lower than the side wall of the laminar flow bath, and is poured into the shallow bath. At this time, since the flow velocity of the cooling fluid that flows over the laminar flow weir and drops downward is slow and the cooling fluid flows in one direction, the cooling fluid enters a laminar flow state. Consequently, the force of a collision between the cooling fluid that flows along the laminar flow weir and drops downward and the bottom portion of the shallow bath or the liquid surface of the cooling fluid that is accumulated in the shallow bath is lessened, and the occurrence of a situation in which an eddy is generated at the time of a collision and new air bubbles are thereby included in the cooling fluid is suppressed. As described above, in the laminar flow bath, air bubbles are removed to a certain extent from cooling fluid that is recovered after being used for quenching and, furthermore, the cooling fluid is placed in a laminar flow state to suppress new entrainment of air bubbles.

The shallow bath into which the cooling fluid is poured from the laminar flow bath further removes air bubbles contained in the cooling fluid in a short time period. The shallow bath has a filter which has a mesh structure, in a bottom portion thereof. The shallow bath supplies the cooling fluid that is poured therein to the supply bath through the filter. By disposing the filter at the bottom portion of the shallow bath, the shallow bath exerts the following two functions. First, the supply of cooling fluid that includes air bubbles to the supply bath is inhibited by the filter, and the filter thus promotes the removal of air bubbles contained in the cooling fluid. Second, the liquid level height of the shallow bath is maintained at a lower height than the height of the laminar flow weir by the filter. Therefore, the liquid level height of the shallow bath is lower than the liquid level height of the cooling fluid inside the laminar flow bath. In the bath in which the liquid level height is lower, the time taken for air bubbles in the cooling fluid to naturally rise to the liquid surface is shorter. Accordingly, the shallow bath can remove air bubbles from the cooling fluid in a short time period.

By means of the above described air bubble removal steps that are performed in two stages, in the quenching apparatus of the present embodiment the amount of air bubbles contained in the cooling fluid circulating in a large quantity is reduced in a short time period, and the cooling fluid is reused for quenching. Consequently, the cooling capacity of the cooling fluid can be enhanced.

The filter is, for example, a nonwoven fabric, a perforated plate (metallic plate or non-metallic plate) or a net made of steel wire.

Preferably, in the bottom portion of the shallow bath, a portion covered with the filter slopes progressively downward as the distance from the laminar flow bath increases.

In this case, the flow of cooling fluid in the shallow bath can be made a flow that is in a single direction by the slope. By this means, the occurrence of a situation in which fluctuations arise in the flow of cooling fluid and an eddy is generated can be suppressed, and the generation of air bubbles can thus be inhibited.

In addition, the following effect is obtained by the slope. At an upstream portion (laminar flow bath side) of the filter, cooling fluid which contains few air bubbles passes through the filter. On the other hand, cooling fluid in which there is a lot of air bubbles cannot pass through the upstream portion of the filter. Therefore, the cooling fluid in which there is a lot of air bubbles flows to a downstream portion of the filter along the slope. As a result, cooling fluid in which there is a lot of air bubbles accumulates at a lower part of the shallow bath. As described above, because the liquid level height of the shallow bath is low, at the lower part of the shallow bath the air bubbles contained in the cooling fluid rise to the surface naturally and disappear. Thus, a wide contact area (area which the cooling fluid passes through) of the laminar cooling fluid with respect to the filter can be obtained based on the flow of the cooling fluid along the slope.

For instance, if the portion covered by the filter did not slope, the cooling fluid that flows over the laminar flow weir would collide in a concentrated manner with the filter in the vicinity of the laminar flow weir. Even in a case of the cooling fluid including air bubbles, there is a high possibility that the cooling fluid including the air bubbles pass through the filter if the cooling fluid enters the filter from the vertical direction. On the other hand, in a case where the bottom portion of the shallow bath is sloped as described above, a vertical direction component of the cooling fluid velocity decreases in comparison to a case where the bottom portion is not sloped. In this case, if the flow path resistance is the same, in comparison to the case where the bottom portion of the shallow bath is not sloped, it is more difficult for the cooling fluid that includes air bubbles to pass through the filter in the case where the bottom portion is sloped. In addition, because the passage area of the cooling fluid with respect to the filter can be increased, air bubbles contained in the cooling fluid can be removed more efficiently.

Preferably, the quenching apparatus further includes a conveyance member. The conveyance member is disposed at a lower part of the filter and has a sloping flow path. The conveyance member pours the cooling fluid that passed through the filter into the supply bath.

In this case, because the flow path slopes, the cooling fluid that passed through the filter flows along the flow path in one direction. Consequently, in comparison to a case where the cooling fluid drops naturally in the vertical direction into the supply bath, the flow velocity of the cooling fluid decreases because of the flow path resistance of the conveyance member. As a result, the velocity at which the cooling fluid collides with the surface of the liquid in the supply bath can be reduced, and the generation of air bubbles in the cooling fluid before reaching the cooling apparatus that is at a stage after the defoaming apparatus can be suppressed.

Preferably, the supply bath includes a side wall and a first flow path weir. The side wall has a discharge port in a lower part thereof. In the supply bath, the first flow path weir is disposed at a position that is closer to the side wall than to a position that is directly below the filter. The first flow path weir has an opening portion at a lower part thereof. Cooling fluid that passes through the filter and is supplied into the supply bath passes through the opening portion of the first flow path weir and reaches the discharge port.

In this case, cooling fluid will not reach the discharge port unless the cooling fluid passes through the opening portion formed in the lower part of the first flow path weir. Therefore, when passing through the first flow path weir, the cooling fluid flows along the lower part in the supply bath. At such time, because air bubbles contained in the cooling fluid rise to the surface, it is easy for air bubbles to be removed from the cooling fluid that passes through the opening portion.

Preferably, the supply bath further includes a second flow path weir. The second flow path weir is disposed between the first flow path weir and the side wall that has the discharge port, and is lower than the side wall. After the cooling fluid that passes through the filter and is supplied into the supply bath passes through the opening portion in the first flow path weir, the cooling fluid flows over the second flow path weir and reaches the discharge port.

In this case, the flow path of the cooling fluid inside the supply bath can be further lengthened by the first and second flow path weirs. In addition, there is also an increase in the number of times that the cooling fluid moves in the vertical direction in the flow path of the cooling fluid. Therefore, air bubbles are even more likely to rise to the surface.

Preferably, the circulation apparatus includes a main pipe that allows cooling fluid to pass therethrough, and a plurality of branch pipes which branch from the main pipe and which each have a supply port. The cooling fluid is poured into the laminar flow bath from the branch pipes. A total of the transverse cross-sectional areas of the respective branch pipes is greater than the transverse cross-sectional area of the main pipe.

In this case, the flow of the cooling fluid in the main pipe is branched. At such time, because the total of the transverse cross-sectional areas (at a cross-section perpendicular to the central axis of the branch pipe) of the respective branch pipes is greater than the transverse cross-sectional area (at a cross-section perpendicular to the central axis of the main pipe) of the main pipe, the flow velocity of cooling fluid when the cooling fluid is supplied into the laminar flow bath decreases. Consequently, the force of a collision with cooling fluid that is already accumulated in the laminar flow bath is lessened. As a result, generation of air bubbles in the cooling fluid can be suppressed.

Preferably, the circulation apparatus also includes an accumulation bath. The accumulation bath accumulates cooling fluid that is recovered after being used for quenching. The circulation apparatus supplies the cooling fluid inside the accumulation bath to the defoaming bath.

In this case, cooling fluid is accumulated in the accumulation bath before being supplied to the defoaming bath. In the accumulation bath, not only air bubbles included in the cooling fluid after the cooling fluid is used for quenching, but also scale and the like naturally rise to the surface and are removed. Consequently, air bubbles and scale contained in the cooling fluid can be removed in advance to a certain extent before the cooling fluid is supplied to the defoaming bath.

The method for producing a metallic material of the present embodiment utilizes the above described quenching apparatus. The method for producing includes a step of heating a metallic material, and a step of performing quenching of the metallic material by spraying a cooling fluid onto the heated metallic material. The step of performing quenching includes a step of removing air bubbles from the cooling fluid by means of a defoaming apparatus, and a step of spraying the cooling fluid after air bubbles are removed onto the heated metallic material.

The method for producing a metallic material according to the present embodiment removes air bubbles from cooling fluid before the cooling fluid is used for quenching. Therefore, the cooling capacity of the cooling fluid increases, and the metallic material is adequately quenched. As a result, variations in the quenching of the metallic material can be reduced. When the method for producing a metallic material of the present embodiment is performed using 3DQ equipment, quenching of a metallic material portion that was bent by the 3DQ equipment is stably performed in a substantially uniform manner. Therefore, the accuracy of a processed shape of a metallic material that is processed by the 3DQ equipment is stable.

The details of the quenching apparatus according to the present embodiment are described hereunder.

First Embodiment

[3DQ Equipment]

The quenching apparatus of the present embodiment is utilized, for example, in 3DQ equipment. FIG. 1 is a perspective view of 3DQ equipment 100. As illustrated in FIG. 1, the 3DQ equipment 100 includes a feeding apparatus 110, a supporting apparatus 120, a quenching apparatus 1 and a gripping apparatus 130.

The feeding apparatus 110 conveys a metallic material 10 at a predetermined feeding speed in an axial direction X of the metallic material 10. The metallic material 10 is, for example, a metal pipe, for example a steel pipe. The feeding apparatus 110 includes a gripping member 111 and a conveyance apparatus 112. The gripping member 111 is connected to the conveyance apparatus 112. The gripping member 111 rotatably grips the metallic material 10 around the central axis of the metallic material 10. The conveyance apparatus 112 moves the metallic material 10 in the axial direction X thereof together with the gripping member 111. The conveyance apparatus 112 is, for example, a mechanism that uses an electric servo cylinder or a ball screw or the like.

The supporting apparatus 120 is disposed on the downstream side (X direction) relative to the feeding apparatus 110. The supporting apparatus 120 supports the metallic material 10 that is conveyed in the axial direction (X direction). The supporting apparatus 120 includes, for example, a pair of roller groups 121. The pair of roller groups 121 pinch the metallic material 10, and support the metallic material 10 so as to be movable in the axial direction X. The supporting apparatus 120 may be equipped with a different configuration instead of the pair of roller groups 121.

The quenching apparatus 1 is disposed on the downstream side of the supporting apparatus 120. The quenching apparatus 1 includes a heating apparatus 2 and a cooling apparatus 3. The cooling apparatus 3 is disposed on the downstream side of the heating apparatus 2.

The quenching apparatus 1 heats a portion of the metallic material 10 that is conveyed. A bending moment is applied by the gripping apparatus 130 to the heated portion of the metallic material 10. That is, in the 3DQ equipment, the heated portion of the metallic material 10 is subjected to a bending process while the metallic material 10 is being moved in the X direction. The heated portion that was bendingly deformed is quenched by the cooling apparatus 3.

The gripping apparatus 130 moves and rotates while gripping the metallic material 10. By this means, the gripping apparatus 130 applies a bending moment to the heated portion of the metallic material 10. The gripping apparatus 130 is, for example, a pair of movable roller-dies as illustrated in FIG. 1. The gripping apparatus 130 may be a multi-axis robot arm instead of the movable roller-dies.

[Quenching Apparatus 1]

Figure 2:
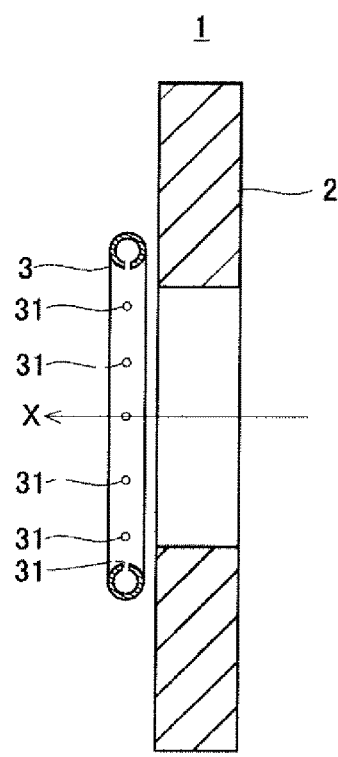
FIG. 2 is a cross-sectional view of the quenching apparatus shown in FIG. 1.

FIG. 2 is a cross-sectional view of the quenching apparatus 1 shown in FIG. 1. As described above, the quenching apparatus 1 includes the heating apparatus 2 and the cooling apparatus 3.

The heating apparatus 2 is an annular or cylindrical shape. The metallic material 10 is passed through the inside of the heating apparatus 2. That is, at the time of bending, the heating apparatus 2 is disposed around the metallic material 10. The heating apparatus 2 is, for example, a high-frequency heating coil.

The cooling apparatus 3 is an annular or cylindrical shape. The cooling apparatus 3 has a plurality of spray ports 31 in an inner peripheral surface. The plurality of spray ports 31 spray cooling fluid toward the center (central axis X) of the cooling apparatus 3. The plurality of spray ports 31 may face the downstream side. In this case, the spray ports 31 spray the cooling fluid in the direction of the central axis X on the downstream side. The cooling apparatus 3 may have a plurality of spray nozzles. In this case, the aforementioned plurality of spray ports 31 correspond to spray nozzle ports. The cooling fluid is, for example, water or an antifreeze solution.

[Defoaming Apparatus 4]

Figure 3:
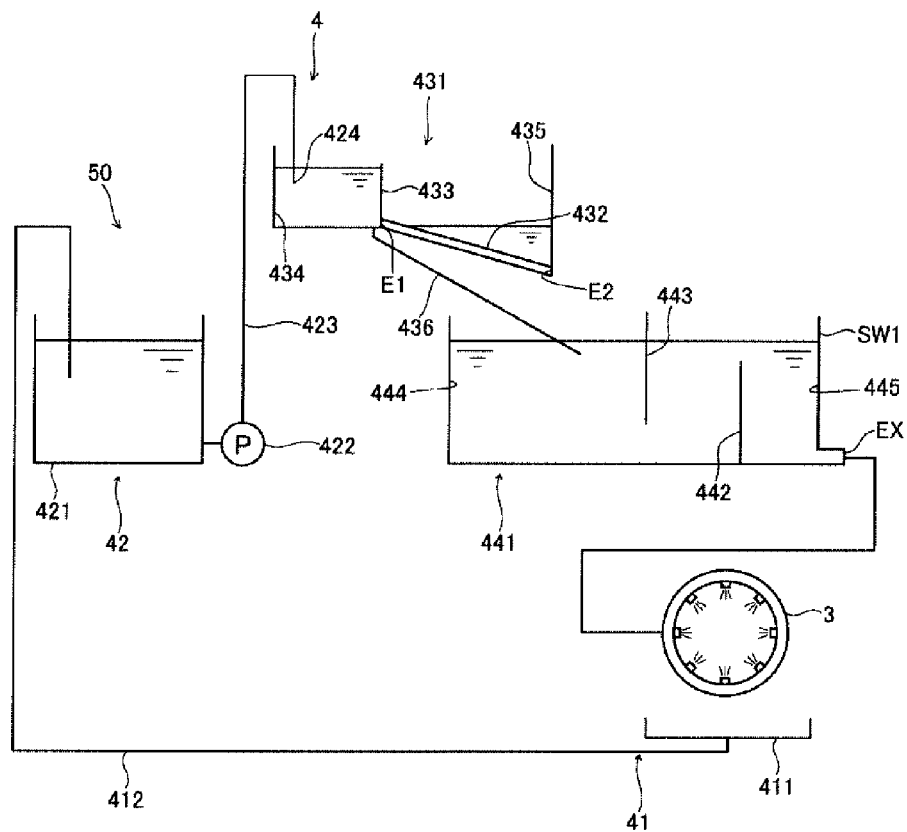
FIG. 3 is a schematic diagram of a defoaming apparatus included in the quenching apparatus of the present embodiment.

The quenching apparatus 1 further includes a defoaming apparatus 4 and a supply bath 441 that are illustrated in FIG. 3. The defoaming apparatus 4 removes air bubbles from the cooling fluid before the cooling fluid is supplied to the cooling apparatus 3. The supply bath 441 accumulates cooling fluid after air bubbles are removed by the defoaming apparatus 4. The cooling apparatus 3 sprays the cooling fluid that is supplied from the supply bath 441 toward the metallic material to cool the metallic material.

If a large amount of air bubbles are included in the cooling fluid, the cooling capacity of the cooling fluid at the time of spraying decreases. This is because the air bubbles have a lower cooling capacity than the cooling fluid. The greater the amount of air bubbles included in the cooling fluid is, the more the cooling capacity decreases. Therefore, when the cooling fluid is sprayed to perform quenching, it is difficult to achieve stable quenching. If stable quenching cannot be achieved in a uniform manner in the 3DQ equipment 100, it is difficult to achieve stable accuracy with respect to the processed shape of the metallic material 10 that is bent.

In the quenching apparatus 1 of the present embodiment, the defoaming apparatus 4 removes air bubbles from the cooling fluid before the cooling fluid is utilized for quenching. Therefore, the cooling capacity at the time of quenching is enhanced and is stable. As a result, the hardenability is enhanced and the quenching effect is stably achieved. In this case, in the 3DQ equipment 100, the accuracy of the processed shape of the metallic material 10 that was subjected to a bending process is stably obtained. The defaming apparatus 4 is described in detail hereunder.

The defoaming apparatus 4 includes a circulation apparatus 50 and a defoaming bath 431.

Cooling fluid that is sprayed from the cooling apparatus 3 during quenching collides with the metallic material 10, with the cooling fluid itself, or with a constituent member of the apparatus. A large amount of air bubbles are contained in the cooling fluid due to such collisions.

As described above, when performing quenching by spraying cooling fluid, it is preferable that the amount of air bubbles contained in the cooling fluid be as small as possible. Therefore, the defoaming bath 431 in the defoaming apparatus 4 removes air bubbles contained in the cooling fluid. An accumulation mechanism 42 in the circulation apparatus 50 reduces the amount of air bubbles contained in cooling fluid that is supplied to the defoaming bath 431. The supply bath 441 further reduces the amount of air bubbles contained in cooling fluid after air bubbles are removed at the defoaming bath 431. Hereunder, each component of the defoaming apparatus 4 is described in detail.

[Circulation Apparatus 50]

The circulation apparatus 50 recovers cooling fluid after the cooling fluid is used for quenching and supplies the cooling fluid to the defoaming bath 431. The circulation apparatus 50 includes a recovery mechanism 41 and the accumulation mechanism 42.

[Recovery Mechanism 41]

In the quenching apparatus 1 of the present embodiment, cooling fluid that was used for quenching is recycled. The recovery mechanism 41 recovers cooling fluid that was used for quenching. The recovery mechanism 41 also supplies the recovered cooling fluid to the accumulation mechanism 42. The recovery mechanism 41, for example, includes a collection bath 411 and a pipe 412. The collection bath 411 is disposed, for example, under the cooling apparatus 3 and collects cooling fluid after the cooling fluid has been used. The collected cooling fluid is supplied to the accumulation mechanism 42 through the pipe 412. For example, an unshown pump is utilized to supply the collected cooling fluid. The recovery mechanism 41 may have a configuration that is different to the configuration illustrated in FIG. 3.

[Accumulation Mechanism 42]

The accumulation mechanism 42 accumulates cooling fluid that is supplied from the recovery mechanism 41. The accumulation mechanism 42 includes an accumulation bath 421, a pump 422 and a supply member 423.

The accumulation bath 421 accumulates cooling fluid that was recovered by the recovery mechanism 41. When the recovered cooling fluid is temporarily accumulated in the accumulation bath 421, air bubbles in the cooling fluid inside the accumulation bath 421 naturally rise to the surface. Accordingly, the accumulation bath 421 can reduce the amount of air bubbles in the cooling fluid. In the accumulation bath 421, not only air bubbles in the cooling fluid, but also scale and the like that are included in the cooling fluid after the cooling fluid has been used for quenching also rise to the surface naturally. Therefore, a cooling fluid from which scale and the like has been removed can be supplied to the defoaming bath 431.

The supply member 423 is a pipe that has a supply port on a downstream side. Cooling fluid that flows out from the supply port is supplied to the defoaming bath 431. The pump 422 supplies the cooling fluid that has been temporarily accumulated in the accumulation bath 421 to the defoaming bath 431 through the supply member 423.

[Defoaming Bath 431]

The defoaming bath 431 removes air bubbles from the cooling fluid using a filter. The defoaming bath 431 includes a laminar flow weir 433. The laminar flow weir 433 partitions the defoaming bath 431 into a laminar flow bath 434 and a shallow bath 435. The supply port of the supply member 423 is disposed in the laminar flow bath 434. Thus, cooling fluid that is conveyed from the accumulation bath 421 is supplied to the laminar flow bath 434. The laminar flow bath 434 temporarily accumulates cooling fluid. Air bubbles contained in the cooling fluid naturally rise to the surface during the accumulation period and disappear at the liquid surface. Accordingly, the amount of air bubbles in the cooling fluid is decreased by the laminar flow bath 434.

Preferably, the supply port of the supply member 423 is disposed inside the laminar flow bath 434 at a position that is lower than the upper end of the laminar flow weir 433. In this case, the supply port is disposed at a position that is below the liquid surface of the laminar flow bath 434. Consequently, without coming in contact with the air, the cooling fluid that comes out from the supply port pours into the cooling fluid that is accumulated in the laminar flow bath 434. It is thus difficult for air bubbles to enter the cooling fluid.

The shallow bath 435 includes a bottom portion that has an opening, and a filter 432. The filter 432 is disposed in the opening in the bottom portion. The filter 432 is a plate shape or a sheet shape, and has a mesh structure. More specifically, the filter 432 has a plurality of holes (through-holes). Preferably, the plurality of holes are of a size which makes it difficult for air bubbles contained in the cooling fluid to pass therethrough.

Flow path resistance arises when a fluid such as a liquid or a gas passes through the holes in the filter 432. The higher the proportion of air bubbles contained in the cooling fluid is, the larger the flow path resistance becomes. Therefore, it is easy for cooling fluid which contains a small amount of air bubbles to pass through the filter 432, and it is difficult for cooling fluid which contains a large amount of air bubbles to pass through the filter 432. Based on this principle, air bubbles are removed when the cooling fluid from the laminar flow weir 433 passes through the filter 432. As a result, the amount of air bubbles in cooling fluid that has passed through the filter 432 is small. Consequently, the cooling capacity of the cooling fluid increases. In addition, since the filter 432 has flow path resistance, the filter 432 forms a shallow amount of cooling fluid in the shallow bath 435. Since the liquid level height of the shallow amount of cooling fluid is low, the distance for the amount of air bubbles in the cooling fluid to rise to the liquid surface is short. Consequently, air bubbles contained in the cooling fluid can rise to the liquid surface and be removed in a short time period. Because air bubbles are removed from cooling fluid at the bottom portion inside the shallow bath 435 and it is possible for the cooling fluid to pass through the filter 432, the cooling fluid is supplied to the supply bath 441.

The filter 432 is not particularly limited as long as the filter 432 has holes that are capable of inhibiting the passage of air bubbles therethrough. For example, the filter 432 is a nonwoven fabric, a net made of steel wire, or a perforated plate. The perforated plate may be a metallic plate or may be a non-metallic plate.

The height of the laminar flow weir 433 is lower than the height of a side wall of the laminar flow bath 434. Therefore, when the height of cooling fluid accumulated in the laminar flow bath 434 exceeds the height of the laminar flow weir 433, the cooling fluid overflows from the laminar flow bath 434 and flows into the shallow bath 435. At such time, the cooling fluid flows along the laminar flow weir 433 and reaches the filter 432 by flowing down naturally.

In the defoaming bath 431, the amount of air bubbles that remain in the cooling fluid is reduced by performing the following air bubble removal steps in two stages.

In a first air bubble removal step, in the laminar flow bath 434, air bubbles are removed from the cooling fluid supplied from the circulation apparatus 50, and the flow of the cooling fluid is also regulated (made into a laminar flow). Specifically, recovered cooling fluid is supplied to the laminar flow bath 434 by the circulation apparatus 50. The cooling fluid supplied by the circulation apparatus 50 is in a turbulent state and includes a large amount of air bubbles. In the laminar flow bath 434, time can be given for temporarily accumulating the cooling fluid. As a result, air bubbles included in the cooling fluid that is being accumulated naturally rise to the surface, and disappear at the liquid surface. Thus, a certain amount of air bubbles contained in the cooling fluid is removed by the laminar flow bath 434.

As described above, the laminar flow weir 433 is lower than the side wall of the laminar flow bath 434. Therefore, cooling fluid in which the amount of air bubbles has been reduced to a certain extent passes over the upper end of the laminar flow weir 433 that is lower than the side wall of the laminar flow bath 434 to thereby overflow from the laminar flow weir 433 into the shallow bath 435. At such time, the flow velocity of the cooling fluid that flows down along the laminar flow weir 433 is decreased and the cooling fluid flows in one direction to enter a laminar flow state. Preferably, the laminar flow weir 433 has a wide width. In this case, the cooling fluid that flows down along the laminar flow weir 433 is likely to further enter a laminar flow state.

As described above, the laminar flow bath 434 removes air bubbles to a certain extent from cooling fluid that is recovered after being used for quenching. In addition, because cooling fluid in a turbulent state is poured into the shallow bath 435 in a laminar flow state, the force of a collision between the cooling fluid when the cooling fluid is poured into the shallow bath 435 and the cooling fluid that has accumulated inside the shallow bath 435 is lessened, and thus the entry of more air bubbles into the cooling fluid due to the collision is suppressed.

In a second air bubble removal step, air bubbles are further removed from cooling fluid in the shallow bath 435. As described above, the shallow bath 435 has the (porous) filter 432 which has a mesh structure, in a bottom portion thereof. In the shallow bath 435, the following two functions are exerted by disposing the filter 432 at the bottom portion thereof. First, the supply of cooling fluid that includes air bubbles to the supply bath 441 is inhibited by the filter 432, and the filter 432 thus promotes the removal of air bubbles contained in the cooling fluid. Second, the liquid level height of the shallow bath 435 is maintained at a lower height than the height of the laminar flow weir 433 by the filter 432. Therefore, the liquid level height in the shallow bath 435 is lower than the liquid level height in the laminar flow bath 434. In the bath in which the liquid level height is lower, the time taken for air bubbles contained in the cooling fluid to naturally rise to the surface is shorter. Thus, the shallow bath can further remove air bubbles from the cooling fluid in a laminar flow state in a short time period.

Although the liquid level height in the shallow bath 435 is not particularly limited as long as the height is lower than the height of the laminar flow weir 433, preferably the liquid level height in the shallow bath 435 is 30 cm or less, and more preferably is 20 cm or less. As long as the liquid level height in the shallow bath 435 is within the aforementioned preferable range, the time taken until air bubbles contained in cooling fluid that accumulates in the shallow bath 435 naturally rise to the liquid surface will be short. Therefore, air bubbles can be removed more effectively. Preferably the area of the filter 432 of the shallow bath 435 is wide. The wider the area of the filter 432 is, the lower the liquid level height in the shallow bath 435 will be.

Preferably, in the bottom portion of the shallow bath 435, a portion that the filter 432 covers slopes progressively downward as the distance from the laminar flow bath 434 increases. Specifically, in the portion that the filter 432 covers among the entire bottom portion of the shallow bath 435, in comparison to an edge E1 on the laminar flow bath 434 side, an edge E2 on the opposite side to the edge E1 is disposed at a more downward position.

In this case, it is easy for the cooling fluid that flows down along the laminar flow weir 433 to flow in one direction from the edge E1 toward the edge E2. If the direction in which the cooling fluid flows is not fixed, the flow of the cooling fluid may fluctuate and an eddy may be generated. In such a case, air bubbles are liable to become entrained in the cooling fluid. Because the bottom of the shallow bath 435 of the present embodiment slopes, the flow of the cooling fluid is less likely to fluctuate. It is thus difficult for air bubbles to become entrained in the cooling fluid In addition, in the shallow bath 435, the following effect is obtained by the slope. At an upstream portion (laminar flow bath side) of the filter 432, cooling fluid in which there are few air bubbles passes through the filter 432. On the other hand, cooling fluid in which there is a large amount of air bubbles cannot pass through the filter 432 at the upstream portion thereof. Consequently, cooling fluid that includes a large amount of air bubbles flows along the slope to the downstream portion of the filter 432. As a result, cooling fluid that includes a large amount of air bubbles accumulates at the lower part of the shallow bath 435. As described above, because the liquid level height of the shallow bath 435 is low, at the lower part of the shallow bath 435 the air bubbles contained in the cooling fluid naturally rise to the surface and disappear. Thus, based on the flow of the cooling fluid along the slope, the cooling fluid that flows in a laminar flow can obtain a wide area of contact (area through which cooling fluid passes) with the filter 432.

For instance, if the portion covered by the filter 432 did not slope, the cooling fluid that crossed over the laminar flow weir 433 would collide in a concentrated manner with the filter at a position in the vicinity of the laminar flow weir 433. There is a high possibility that cooling fluid containing air bubbles pass through the filter 432 even if the cooling fluid containing air bubbles enters the filter from the vertical direction. In contrast, when the bottom portion of the shallow bath 435 is sloped as described above, a vertical direction component of the cooling fluid velocity decreases in comparison to a case where the bottom portion is not sloped. In this case, if the flow path resistance is the same, in comparison to a case where the bottom portion of the shallow bath 435 does not slope, it is more difficult for cooling fluid containing air bubbles to pass through the filter 432 in the case where the bottom portion is sloped. In addition, because the area for the passage of cooling fluid through the filter 432 can be increased, air bubbles contained in cooling fluid can be removed more efficiently.

In short, in a case where the shallow bath 435 is sloped, a portion of the cooling fluid that contains a small amount of air bubbles can be caused to pass through the filter 432 at an early stage, and with respect to cooling fluid containing a large amount of air bubbles, the air bubbles are removed at the lower part of the shallow bath 435 by utilizing the fact that the air bubbles naturally rise to the surface. Therefore, a large amount of cooling fluid in which there are few air bubbles can be efficiently supplied to the supply bath 441 in a short time period.

The defoaming apparatus 4 further includes a conveyance member 436. The conveyance member 436 is disposed below the filter 432. The upper face of the conveyance member 436 has a sloped flow path. Specifically, the flow path slopes downward as the distance from the laminar flow bath 434 increases. The conveyance member 436 is, for example, a member in which a groove (flow path) is formed. The conveyance member 436 may also be a plate shape in which side walls are formed.

The feed angle of the flow path may differ from the feed angle of the filter 432, or may be the same as the feed angle of the filter 432. The cooling fluid that passes through the filter 432 flows down into the supply bath 441 along the flow path of the conveyance member 436. At this time, the direction in which the cooling fluid flows is likely to be constant, and it is difficult for an eddy to be generated in the downward flow. Consequently, it is difficult for air bubbles to become entrained in the cooling fluid.

[Supply Bath 441]

The supply bath 441 supplies cooling fluid after air bubbles are removed by the defoaming bath 431 to the cooling apparatus 3. At such time, the supply bath 441 supplies cooling fluid to the cooling apparatus 3 while inhibiting entrainment of air bubbles into the cooling fluid supplied from the defoaming bath 431.

The supply bath 441 includes a side wall SW1 that has a discharge port EX at a lower part thereof. Preferably, the supply bath 441 further includes flow path weirs 442 and 443. Preferably, the supply bath 441 is disposed at a position that is lower than the position of the defoaming bath 431.

Preferably, the lower end of the flow path of the conveyance member 436 is disposed at a position inside the supply bath 441 that is a position which is below the upper end of the side wall of the supply bath 441. In this case, the lower end of the flow path of the conveyance member 436 is disposed in the vicinity of the liquid surface inside the supply bath 441 or below the liquid surface. Therefore, the force of a collision between cooling fluid that flows down along the flow path and the liquid surface can be lessened, and the generation of air bubbles can be suppressed.

The supply bath 441 is partitioned into a bath 444 and a bath 445 by the flow path weir 442. The flow path weir 442 is disposed closer to the side wall SW1 than to a position that is directly below the filter 432. Preferably, the flow path weir 442 is disposed between the lower end of the flow path of the conveyance member 436 and the discharge port EX. In FIG. 3, the flow path weir 442 is disposed between the flow path weir 443 and the side wall SW1. The flow path weir 442 is erectly disposed on the bottom of the supply bath 441. The discharge port EX is formed at a lower part of the side wall SW1 of the bath 445. By forming the discharge port EX at the lower part, cooling fluid can be supplied to the cooling apparatus 3 without taking in air bubbles that rose to the surface.

The flow path weir 442 is lower than the side wall of the supply bath 441. Therefore, cooling fluid that passed through the filter 432, more preferably, cooling fluid that flowed to the supply bath 441 from the flow path of the conveyance member 436, flows over the flow path weir 442 and arrives at the discharge port EX.

The flow path weir 443 is disposed closer to the side wall SW1 than to a position directly below the filter 432 inside the supply bath 441. In FIG. 3, the flow path weir 443 is disposed between the lower end of the flow path of the conveyance member 436 and the flow path weir 442. That is, the flow path weir 443 partitions the bath 444 into a further two baths. The flow path weir 443 has an opening portion at a lower part thereof. In the flow path weir 443, one portion of the lower part may be open or all of the lower part may be open. Preferably, the upper end of the flow path weir 443 is disposed at a position that is equal to or higher than the upper end of the side wall of the supply bath 441.

The flow path weirs 442 and 443 form a flow path for cooling fluid inside the supply bath 441. Specifically, cooling fluid that flowed to the supply bath 441 from the flow path of the conveyance member 436 flows downward because of the presence of the flow path weir 443. The cooling fluid passes through the opening portion at the lower part of the flow path weir 443. Thereafter, the cooling fluid ascends because of the presence of the flow path weir 442. After the cooling fluid flows over the flow path weir 442, the cooling fluid flows downward again and reaches the discharge port EX.

In short, the cooling fluid ascends and descends repeatedly inside the supply bath 441 to reach the discharge port EX. Consequently, the supply bath 441 forms a long flow path in comparison to a case in which the flow path weir 442 and the flow path weir 443 are not provided. If the flow path along which the cooling fluid passes is long, time can be given to allow air bubbles to naturally rise to the surface. Therefore, air bubbles contained in the cooling fluid are likely to rise to the surface and be thereby removed. In addition, because of the presence of the flow path weir 442 and the flow path weir 443, the flow path includes a flow in the vertical direction. The flow in the vertical direction promotes the surfacing of air bubbles. As a result, air bubbles contained in the cooling fluid are easily removed.

Cooling fluid that comes out from the discharge port EX is supplied to the cooling apparatus 3 by an unshown pump or the like. The cooling fluid is sprayed from spray ports of the cooling apparatus 3 and quenches the metallic material.

[Method for Producing Metallic Material]

A method for producing a metallic material according to the present embodiment quenches the metallic material using the quenching apparatus 1 in the 3DQ equipment 100.

First, the metallic material 10 is heated by the heating apparatus 2. A bending moment is applied to the heated metallic material 10 using the gripping apparatus 130 to bend the metallic material 10. Quenching of the bent metallic material 10 is performed by spraying cooling fluid from the cooling apparatus 3 (quenching process).

The quenching process includes an air bubble removal process and a cooling process. In the air bubble removal process, air bubbles contained in the cooling fluid after the cooling fluid is used for quenching are removed using the defoaming apparatus 4. In the cooling process, cooling fluid after air bubbles are removed and in which the amount of air bubbles decreased is sprayed from the cooling apparatus 3 to cool the metallic material 10. As a result, substantially uniform quenching is stably achieved. If quenching is uniformly and stably achieved in the 3DQ equipment 100, the accuracy of a processed shape of the metallic material 10 that was bent is also stably obtained. A quenched metallic material can be produced by the above described processes.

Second Embodiment

Figure 4:
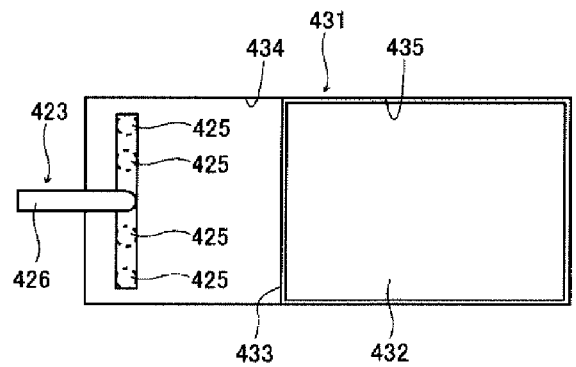
FIG. 4 is a plan view of a defoaming bath included in the defoaming apparatus shown in FIG. 3.
Figure 5:
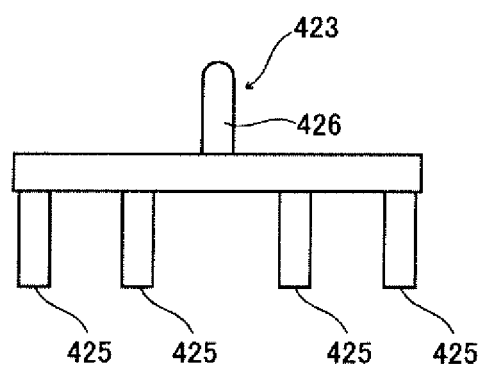
FIG. 5 is a front view of a supply member shown in FIG. 4.

A discharge portion of the supply member 423 in the circulation apparatus 50 may be branched into a plurality of branch pipes. FIG. 4 is a plan view of the supply member 423 and a peripheral portion thereof in the quenching apparatus 1 according to a second embodiment. FIG. 5 is a front view of the supply member 423.

As illustrated in FIG. 4 and FIG. 5, the supply member 423 includes a main pipe 426 and a plurality of branch pipes 425. The plurality of branch pipes 425 branch from the main pipe 426. An end portion of each branch pipe 425 is open and constitutes a supply port. The total of the transverse cross-sectional areas of the respective branch pipes 425 (area of a cross-section perpendicular to the central axis of the branch pipe 425) is greater than the transverse cross-sectional area of the main pipe 426 (area of a cross-section perpendicular to the central axis of the main pipe 426).

In the present embodiment, cooling fluid that is conveyed through the main pipe 426 branches into the plurality of branch pipes 425. As described above, the total of the transverse cross-sectional areas of the respective branch pipes 425 is greater than the transverse cross-sectional area of the main pipe 426. Consequently, the flow rate of the cooling fluid at the respective branch pipes 425 is less than the flow rate of the cooling fluid that flows through the main pipe 426. As a result, the flow velocity of the cooling fluid in the vicinity of the supply ports is slower than the flow velocity of the cooling fluid inside the main pipe 426. If the flow velocity is slow, the force of a collision between cooling fluid discharged from the branch pipes 425 and the liquid surface inside the laminar flow bath 434 is lessened. Therefore, the generation of air bubbles in the cooling fluid can be suppressed.

Preferably, the total of the cross-sectional inside areas of the plurality of branch pipes 425 is greater than the cross-sectional inside area of the main pipe 426. In this case, the flow velocity of the cooling fluid inside the branch pipes 425 is less than the flow velocity in the main pipe 426.

Other Embodiments

In the above described embodiments, the quenching apparatus is equipped with the defoaming apparatus 4 including the circulation apparatus 50 and the defoaming bath 431, and the supply bath 441. However, a configuration may also be adopted in which the quenching apparatus includes at least the defoaming bath 431 and the supply bath 441. In this case, cooling fluid that is sprayed from the cooling apparatus 3 is directly supplied to the defoaming bath 431. Cooling fluid after air bubbles are removed at the defoaming bath 431 is supplied via the supply bath 441 to the cooling apparatus 3.

A portion of the bottom of the shallow bath 435 need not be sloped, and the bottom portion which the filter 432 covers need not be slopingly disposed. In this case also, the filter 432 can remove air bubbles from the cooling fluid.

The conveyance member 436 need not be provided. In this case, cooling fluid that passes through the filter 432 naturally drops down into the supply bath 441 that is disposed below the filter 432. Air bubbles in the cooling fluid have been removed by the filter 432. Consequently, even if the conveyance member 436 is not provided, the air-bubble removal effect by the filter 432 is maintained to a certain extent.

The flow path weir 442 and/or flow path weir 443 of the supply bath 441 need not be provided. Even in this case, the supply bath 441 temporarily accumulates cooling fluid, similarly to the accumulation bath 421. Therefore, it is easy for air bubbles contained in the cooling fluid to rise to the surface and thus the air bubbles will be removed to a certain extent. For example, a configuration may be adopted in which the flow path weir 443 is provided in the supply bath 441 and the flow path weir 442 is not provided therein. When cooling fluid passes through the opening portion at the lower part of the flow path weir 443, the cooling fluid flows through a lower part inside the supply bath 441. At this time, air bubbles contained in the cooling fluid rise to the surface and thus air bubbles contained in the cooling fluid are easily removed.

In the above described embodiments, the supply member 423 inside the circulation apparatus 50 is a pipe. However, a configuration other than a configuration utilizing a pipe may be adopted for the supply member 423. For example, in a case where the accumulation bath 421 is disposed at a higher position than the defoaming bath 431, the supply member 423 may have the similar configuration to the conveyance member 436.

In the above described embodiments, the quenching apparatus 1 is applied to the 3DQ equipment 100. The kind of equipment in the 3DQ equipment 100 is not particularly limited. In FIG. 1, both the supporting apparatus 120 and the gripping apparatus 130 include a pair of rollers or a plurality of pairs of rollers. However, the supporting apparatus 120 and/or the gripping apparatus 130 may be a multi-axis robot arm.

In the above described embodiments, the quenching apparatus 1 is applied to the 3DQ equipment 100. However, the above described quenching apparatus 1 may be utilized in an apparatus other than the 3DQ equipment 100, or the quenching apparatus 1 may be utilized as a discrete apparatus.

Embodiments of the present invention have been described above. However, the above described embodiments are merely examples for implementing the present invention. Accordingly, the present invention is not limited to the above described embodiments, and may be implemented with modifications appropriately made to the above described embodiments within a range which does not deviate from the gist of the present invention.

The invention claimed is:

1. A quenching apparatus that sprays a cooling fluid to quench a metallic material, comprising:
   a defoaming apparatus that removes air bubbles from the cooling fluid,
   a supply bath that accumulates the cooling fluid from which air bubbles have been removed, and
   a cooling apparatus that sprays the cooling fluid that has been supplied from the supply bath toward the metallic material;
   the defoaming apparatus comprising:
   a defoaming bath, and
   a circulation apparatus that recovers the cooling fluid that has been used for quenching, and supplies the cooling fluid to the defoaming bath;
   wherein:
   the defoaming bath includes a laminar flow weir that partitions the defoaming bath into a laminar flow bath and a shallow bath, in that the laminar flow weir is lower than a side wall of the laminar flow bath, and
   the cooling fluid from the circulation apparatus is supplied to the laminar flow bath, and the cooling fluid that flows over the laminar flow weir from the laminar flow bath is poured into the shallow bath,
   the shallow bath including:
   a bottom portion having an opening, and
   a plate-shaped or sheet-shaped filter that covers the opening and has a mesh structure,
   wherein:
   a liquid level height in the shallow bath is less than a height of the laminar flow weir, and
   the supply bath accumulates the cooling fluid that has passed through the filter.

2. The quenching apparatus according to claim 1, wherein a portion covered with the filter of the bottom portion of the shallow bath slopes progressively downward as a distance from the laminar flow bath increases.

3. The quenching apparatus according to claim 1, further comprising:
   a conveyance member that is disposed below the filter and has a sloped flow path, and that pours the cooling fluid that has passed through the filter into the supply bath.

4. The quenching apparatus according to claim 1, wherein the supply bath comprises:
   a side wall of the supply bath having a discharge port at a lower part, and
   a first flow path weir that is disposed in the supply bath at a position that is closer to the side wall of the supply bath than to a position directly below the filter, and that has an opening portion at a lower part;
   wherein the cooling fluid that has passed through the filter and has been supplied into the supply bath passes through the opening portion of the first flow path weir and reaches the discharge port.

5. The quenching apparatus according to claim 4, wherein:
   the supply bath further comprises a second flow path weir that is disposed between the first flow path weir and the side wall of the supply bath, and that is lower than the side wall of the supply bath, and
   after the cooling fluid that has passed through the filter and has been supplied into the supply bath passes through the opening portion of the first flow path weir, the cooling fluid flows over the second flow path weir and reaches the discharge port.

6. The quenching apparatus according to claim 1, wherein the circulation apparatus comprises:
   a main pipe that allows the cooling fluid to pass therethrough, and
   a plurality of branch pipes that branch from the main pipe and that each have a supply port that supplies the cooling fluid to the laminar flow bath;
   wherein a total of transverse cross-sectional areas of the respective branch pipes is greater than a transverse cross-sectional area of the main pipe.

7. The quenching apparatus according to claim 1, wherein:
   the circulation apparatus further comprises an accumulation bath that accumulates the cooling fluid that has been used for quenching and that has been recovered, and the circulation apparatus supplies the cooling fluid in the accumulation bath to the defoaming bath.

8. A method for producing a metallic material using a quenching apparatus according to claim 1, comprising the steps of:

heating the metallic material, and performing quenching of the metallic material that is heated, by spraying cooling fluid onto the metallic material;

wherein the step of performing quenching includes the steps of:

removing air bubbles from the cooling fluid by means of the defoaming apparatus, and spraying the cooling fluid from that the air bubbles were removed onto the metallic material that is heated.

* * * * *